F. CREEDY.
DYNAMO-ELECTRIC MACHINERY.
APPLICATION FILED FEB. 11, 1919.

1,418,779.

Patented June 6, 1922.

INVENTOR
Frederick Creedy
per Hubert Sefton Jones
Attorney.

F. CREEDY.
DYNAMO-ELECTRIC MACHINERY.
APPLICATION FILED FEB. 11, 1919.

1,418,779.

Patented June 6, 1922.
6 SHEETS—SHEET 2.

INVENTOR.
Frederick Creedy
per Herbert Sefton Jones
Attorney.

F. CREEDY.
DYNAMO-ELECTRIC MACHINERY.
APPLICATION FILED FEB. 11, 1919.

1,418,779.

Patented June 6, 1922.
6 SHEETS—SHEET 3.

INVENTOR
Frederick Creedy
per Herbert Sefton Jones
Attorney

UNITED STATES PATENT OFFICE.

FREDERICK CREEDY, OF ILKLEY, ENGLAND.

DYNAMO-ELECTRIC MACHINERY.

1,418,779.  Specification of Letters Patent.  Patented June 6, 1922.

Application filed February 11, 1919. Serial No. 276,263.

*To all whom it may concern:*

Be it known that I, FREDERICK CREEDY, a subject of the King of Great Britain, and residing at 10 Ashburn Place, Ilkley, Yorks, England, have invented new and useful Improved Dynamo-Electric Machinery, of which the following is a specification.

This invention relates to dynamo electric machinery of variable pole number, and in particular to the variation of pole number by variation of the phase difference between zones or bands of current of fixed phase number and width. Such machinery has been described in my former U. S. Patent No. 1,291,424.

It is a chief purpose of this invention to simplify the generating or supply apparatus for such machinery by reducing the number of phases necessary to be produced by such apparatus. To this end the invention contemplates the arrangement and interconnection of the windings of dynamo electric machines in such manner as in fact to produce phases intermediate between, or different from, and additional to, the phases generated in the supply apparatus; and the invention further contemplates the design of supply apparatus, such as transformers, in such manner as to produce those particular phases only of a polyphase supply which are necessary for the derivation of all the phases required by the particular machinery to be supplied.

Alternatively, and in pursuance of the above objects the invention may be said to be directed to the interconnection of sections of the winding of a polyphase dynamo electric machine in such manner that the polygon or polygons of E. M. F. across such sections required for the operation of such machine on different pole numbers shall approximate as nearly as possible to the polygon of E. M. F. of the supply.

A more specific purpose of the invention is the production of a variable speed motor of variable pole number, and in particular of a motor capable of operating on three or more different pole numbers, together with control apparatus for so interconnecting sections of a single winding upon the primary member of said motor as to produce for each pole number a number of similar groups of ampere conductors equally spaced upon said motor and having a common phase difference proportional to the pole number, said connected groups for constant E. M. F. across respective sections of the winding and substantially constant flux density in the air-gap presenting polygons of E. M. F. approximating as nearly as possible to the polygon of supply; and together with a phase converting unit for distorting the E. M. F. polygon of supply to the shapes presented by said motor.

The invention is illustrated in the accompanying drawings in which—

My former application above mentioned pointed out an advantage of using for dynamo electric machinery of the kind in question a number of phases having no common factor with any of the numbers of pairs of poles to be produced in the motor: the advantage being that with this condition fulfilled any given phase was never connected to more than one section of the motor winding whatever the order of connection between the motor tappings and the supply phases. But this choice of phase number imports also certain limitations and requirements; the phase transformer must be capable of transforming the whole of the power from the number of phases of the prime supply to the number of phases required by the motor; also each section of the motor being supplied by an independent phase, and the sections star- or mesh-connected, the polygon of E. M. F. across the sections of the winding was either a number of equally spaced radii (for the star connection) or a regular polygon (for the mesh connection).

If the number of phases chosen is not prime to the numbers of pairs of poles these limitations and requirements do not hold. Certain only of the maximum number of phases required by the motor need to be produced in the phase transforming apparatus; and by interconnection of the sections of the motor winding the polygons of E. M. F. required by the motor may be considerably modified in the direction of approximation to the polygon of supply.

Study of a particular example will help to make clear certain important notions in this connection. A machine having 36 independent sections or groups in its winding will require 36 phases when running on one pole pair or on any number of pole pairs prime to the number of phases. But when the machine is running on a number of pole pairs not prime to the number of phases its winding will contain a plurality of identical sub-divisions excited by the same phases, equal in number to the greatest common factor of the number of pole pairs and the total number of sections. For example if the machine is running on 9 pole pairs, the greatest common factor is 9, and there will be 9 sub-divisions each containing four sections excited by E. M. F. of relative phase displacement 0 degrees, 90 degrees, 180 degrees, and 270 degrees.

If this machine is to operate on all numbers of pole pairs from 1 to 10, it will present the following conditions:—

| No. of phases (N). | No. of pairs of poles ($n$). | No. of identical subdivisions in winding (G. C. M. of N and $n$). | No. of phases exciting each subdivision, 36 (No. of subdivisions). |
|---|---|---|---|
| 36 | 1 | 1 | 36 |
| 36 | 2 | 2 | 18 |
| 36 | 3 | 3 | 12 |
| 36 | 4 | 4 | 9 |
| 36 | 5 | 1 | 36 |
| 36 | 6 | 6 | 6 |
| 36 | 7 | 1 | 36 |
| 36 | 8 | 4 | 9 |
| 36 | 9 | 9 | 4 |
| 36 | 10 | 2 | 18 |

To supply this machine then there must apparently be a phase transformer capable of converting the supply into 4-phase, 6-phase, 9-phase, 12-phase, 18-phase, and 36-phase. The present invention simplifies this requirement.

Figure 1:
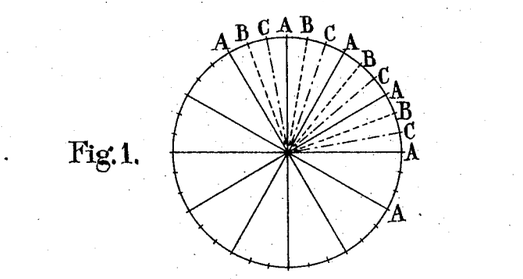
Fig. 1 is a diagram explanatory of the analysis of a polyphase supply of large number of phases.

The process of transforming from the number of phases of the supply to the large number required may be carried out in several stages instead of one, if the large number is not prime. Suppose a 36-phase machine has to be supplied from a 3-phase source; the 36 phases may be obtained in two stages, for instance by transformation from 3-phase to 12 phase, and from 12-phase to 36-phase, or from 3- to 9-phase and from 9 to 36, or again from 3 to 6-phase and from 6- to 36-phase. Fig. 1 shows for example that a 36-phase supply includes a group of phases, marked A, formed by taking every third phase, of which each is displaced from its neighbors by 30 degrees, which group, therefore, constitutes a complete 12-phase system. And the whole 36-phases comprise and can be analyzed into three such 12-phase sets, A, B, C, each set being displaced from its neighbors by 10 degrees. So the first stage of transformation may be effected by a transformer in the manner shown at P in Fig. 2, thus transforming the 3-phase supply into three 3-phase systems differing in phase by 10 degrees; in other words this first phase transformer distorts the E. M. F. polygon of the supply into a nine-sided polygon P, Fig. 2, radii to whose vertices are all equal, and make angles with one another of 10 degrees 10 degrees 100 degrees, 10 degrees 10 degrees 100 degrees, 10 degrees 10 degrees 100 degrees respectively. The second stage of transformation is effected by three other transformers $S_1$, $S_2$, $S_3$, each of which transforms a 3-phase system to 12-phase. These transformers may be assumed to be of the type indicated in Fig. 9 of my former specification above mentioned, the 12-phase E. M. F.'s being obtained from tappings on a primary winding, or built up by joining portions of said primary winding in series with small secondary windings on other limbs of the transformer. In the case illustrated six of the phases are obtainable direct from tappings on the primary winding, the position of which is indicated in the figure by the circles trisecting the sides of the triangles which represent the primary windings and their E. M. F.'s. These three 12-phase systems make up the 36-phases required.

There is no general advantage in thus affecting transformation in two stages instead of one; but in many cases, the second stage, is suitably chosen, can be carried out simply by suitable interconnection of the sections of the motor winding; thereby rendering the second set of transformers unnecessary; and in such cases the division of the transformation into two stages materially simplifies and improves the phase transformer as compared with the transformer that would be necessary to effect the whole transformation in one stage.

Figs. 3 to 9, next to be described, illustrate different methods of so effecting phase-transformation in the motor winding, applicable in different cases.

If two sections of the motor winding, for a particular number of pole pairs, require currents of opposite phase, both sections can be supplied from a single phase of supply if the connections of one section can be reversed. And generally, if the machine requires a supply of an even number of phases, for a particular pole number, the current in any one section of the motor winding will be opposite in phase to the current in some other section. In any such case, therefore, the phase transformer need produce only one of every pair of opposite phases out of the total required, its terminals being thereby reduced by a half; and each of these phases will be used to supply two sections of the motor winding connected in series or in parallel and relatively reversed.

Figure 3:
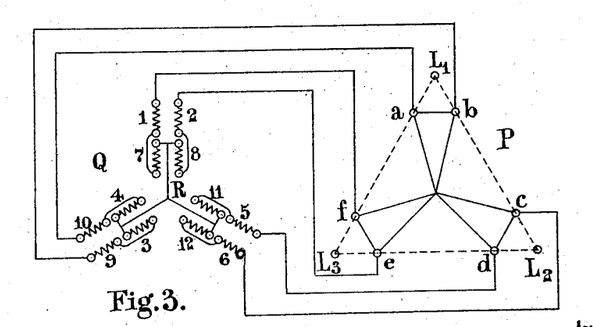
Fig. 3 shows how to transform a polyphase supply in phase transforming apparatus and in a motor winding to produce a high number of phases.

For example, Fig. 3 shows at P the diagram of a phase transformer supplied with three-phase current at its terminals $L_1$, $L_2$, $L_3$, and giving currents of phases 0°, and 30°, 120°, and 150°, 240° and 270°, at its terminals $a$ and $b$, $c$ and $d$, $e$ and $f$. The sections of the winding Q of the motor, in this and in succeeding figures, are numbered consecutively in order around the circumference of the motor, their angular pitch in this case being 30°. They are connected as shown to each other and the phase transformer in relatively reversed pairs, and united into a star at R. The same method applied to the production of 18 phases in the motor, would involve a phase converter generating 9 phases, say in three sets of three, so that the difference in phase angle between the phases taken in order would be 20°, 20°, 80°, 20°, 20°, 80°, 20°, 20°, 80°; and mutually reversed sections in the motor winding would produce the remaining 9 phases.

Figures 17, 18:
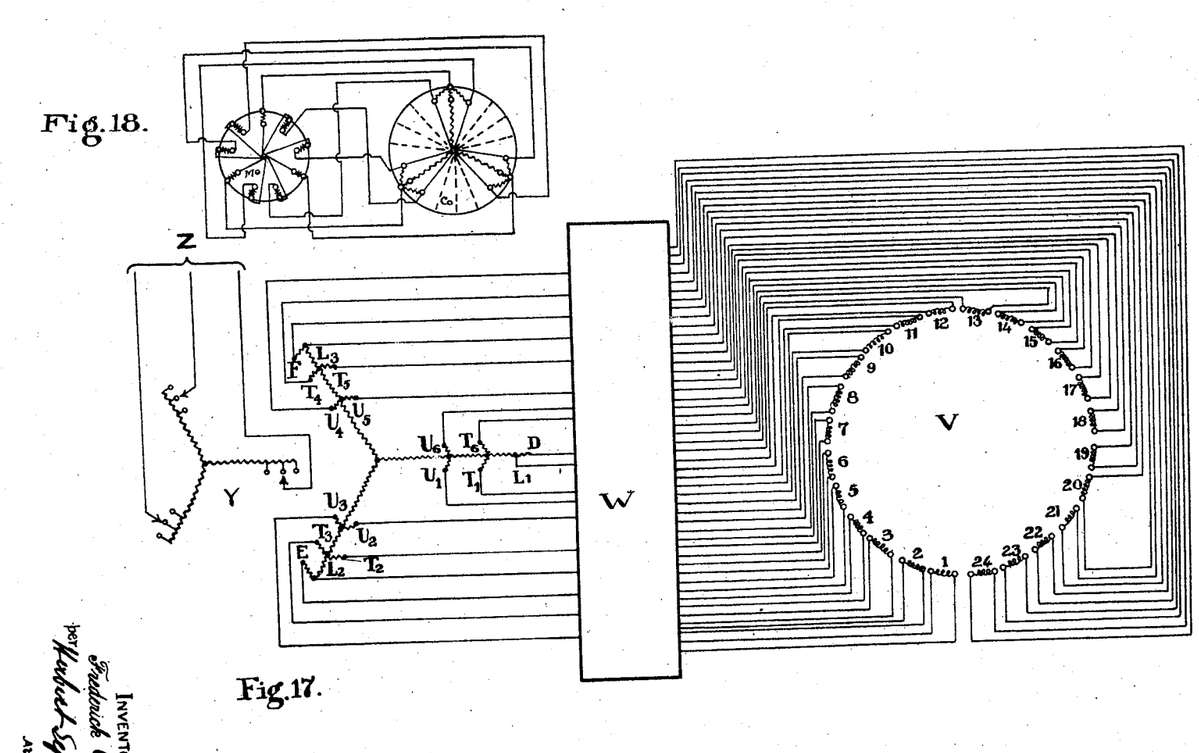
Figure 18 is a further illustration of the transformation of a polyphase supply in phase transforming apparatus and in a motor winding to produce a higher number of phases.

This method may be of value also in producing odd numbers of phases; for instance by the application of it in Figure 18 a converter $C^o$ supplying 9 phases spaced as above in combination with a motor winding Mo having relatively reversed sections produces all the phases of an equally spaced 9 phase system, although the converter may not produce those 9 phases itself directly. And generally a supply of any odd number of phases can be got by the means which will produce a supply of double the number of phases. The advantage of the method in such cases is not that it brings about any reduction in the number of phases to be produced by the converter, but it enables the phases to be produced by the converter to be grouped in sets having a phase difference between the members of each set only one half of the phase required between the phases required; the E. M. F. polygon of the supply derived from the converter thus approximates much more closely to the E. M. F. polygon of the supply to the converter, than would the E. M. F. polygon of an ordinary supply of the required odd number of phases. Examples of the application of this method are referred to hereinafter in connection with Figures 12 and 15.

Figure 4:
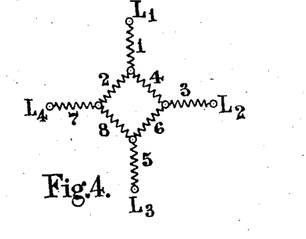
Figs. 4, 5, and 6 illustrate another method of obtaining an increased number of phases from a polyphase supply.
Figure 5:
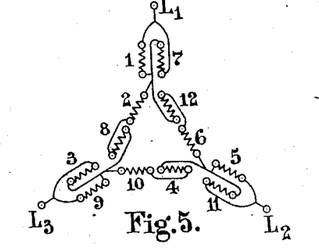

Intermediate phases, additional to those of the supply, can also be obtained by joining the sections of the motor in combinations of star and mesh connections; each junction point being common to three sections, two, say, forming part of a mesh, and the third forming part of a star. For instance the junctions of a set of mesh connected sections may be the mid-points of the limbs of another mesh, of which each limb comprises two sections. A typical example of this method is shown in Fig. 4, in which a section forming one ray of a star is connected to every junction of two sections forming limbs of a mesh, the mesh, in other words, constituting the centre of the star. The case illustrated is the production of 8 phases, differing by 45° from a 4-phase source joined to the terminals $L_1$, $L_2$, $L_3$, $L_4$.

These two methods of obtaining additional phases, or in other words of modifying the polygon of E. M. F.'s required by the motor, may be combined. An example of their joint use appears in Fig. 5, where a 3-phase supply to terminals $L^1$, $L^2$, $L^3$, produces in effect 12-phase currents in the motor winding, the sections of which are joined in relatively reversed pairs to form the rays and limbs of a three ray star with a triangular mesh in its centre. As before explained the numbers show the order of connection of the sections, which are supposed to be numbered in consecutive order around the circumference of the motor. It will be noted that the relatively reversed pairs which form the star rays are joined in parallel, while the relatively reversed pairs which form the mesh are joined in series. This is because the star rays carry the line currents, whereas the mesh limbs carry line currents divided by 3. The parallel connection of sections in the star rays causes each section to take half the line current, i. e. a current approximately equal to that carried by the series connected sections of the mesh limbs, so that the current density is approximately the same in all sections. Exact equality of current density is not essential.

If a mesh star combination has an even number of terminals, as in the 4-phase example considered above, the number of phases cannot be further doubled by mutual reversal of sections. Thus the mesh-star connection combined with reversal of sections will not produce 16-phase from 4-phase, though they will produce 20-phase from 5-phase or 28-phase from 7-phase, or 36-phase from 9-phase. As an example the last of these cases is illustrated by a skeleton diagram in Fig. 6, in which each line represents a pair of sections reversed, those in the star rays being preferably in parallel and those in the mesh limbs in series as in Fig. 5.

Figure 7:
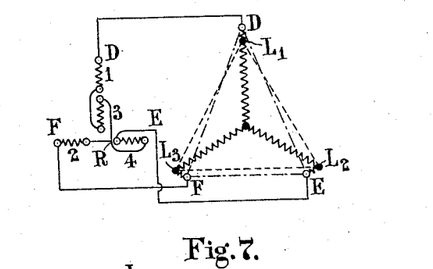
Figs. 7 and 8 show methods of transforming a polyphase supply to a different number of phases with the same number of terminals, and how to utilize the supply thus transformed.

A third method of phase transformation which can be carried out by interconnecting sections of the motor winding is the method of changing a supply of one number of phases to another number of phases having the same number of terminals but a different E. M. F. polygon. The most common examples of this are the change from 3-phase to 2-phase and the converse. This by the use of mutually reversed coils gives 3-phase to 4-phase. It may be carried out by the Scott method of transformation-T-connection-or by the 2-phase 3-wire method-the L-connection-both of which methods involve 3 terminals instead of four. It is essential that all sections of the motor winding should have the same number of turns and therefore exactly the same voltage across them. 4 coils joined as two T-connected pairs of mutually reversed coils, require therefore an E. M. F. polygon in the shape of an isosceles triangle of which the height is equal to the base. The phase transformer has to distort to this shape the equilateral triangle which constitutes the E. M. F. polygon of an ordinary 3-phase supply. This is shown in Fig. 7, $L_1$, $L_2$, $L_3$ is the E. M. F. polygon of supply, D, E, F, the E. M. F. polygon required by the motor; the lines joining D, E, F, to $L_1$, $L_2$, $L_3$ respectively represent the secondary windings required to effect the distortion. The figure shows also how the sections of the motor winding are joined to the transformer and in star at R.

Figure 8:
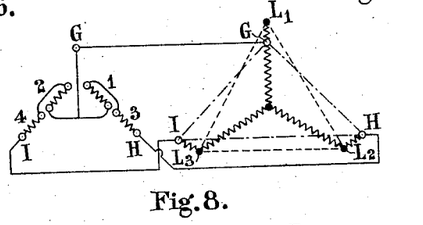

If the four sections are L-connected in mutually reversed pairs, the E. M. F. polygon they require is an isosceles triangle of which the height is half the base. The necessary distortion is effected as indicated in Fig. 8, where the transformer converts from 3-phase at terminals $L_1$, $L_2$, $L_3$, to 4-phase for L-connection at terminals G, H, I, which are joined to the motor sections and those to each other as shown.

Figure 9:
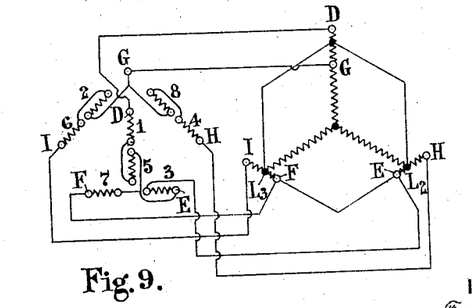
Fig. 9 shows the simultaneous employment of the methods of Figs. 7 and 8.

The T and L connections may be used simultaneously, a part of the motor sections being T-connected and the remainder L-connected; and if mutual reversal of sections is employed also transformation is effected from 3-phase to 8-phase as shown in Fig. 9. It is convenient in these circumstances to make the bases of the triangle of E. M. F. for the T- and L-connected sections parallel, joining them across secondary windings connected to the same terminals of the 3-phase supply. If the equal sides of the isosceles E. M. F. triangle for the L-connected sections represent the same E. M. F. as that across each branch of the T-connected sections, the ratio of the base of the E. M. F. triangle for the T-connected sections to the base of the E. M. F. triangle for the L-connected sections is 2 to $2\sqrt{2}$; and the ratio of the heights of the triangles is 2 to $\sqrt{2}$. The method of arriving at the vector diagram for the phase transformer is indicated by the figure. If a regular hexagon is circumscribed about the triangle $L_1$, $L_2$, $L_3$ representing the prime 3-phase supply, so that angles of said triangle coincide with alternative angles of the hexagon, then the vertices of the two isosceles triangles D, E, F, GH I, representing the E. M. F. polygons required by the motor will lie on a radius of the hexagon, and the ends of their bases will lie on the opposite adjacent sides of the hexagon or on prolongations of those sides. Fig. 9 is lettered to correspond with Figs. 7 and 8 and indicates the secondary windings and tappings required to give the desired phases.

Figure 10:
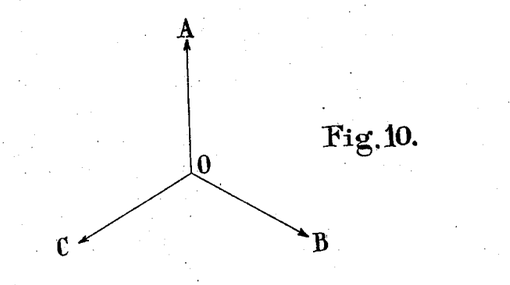
Figs. 10 and 11 are explanatory of the practical carrying out of the method of Fig. 7.

But a T-connection can only be satisfactorily employed in an induction motor or in any machine in which the T-connected windings have to produce a magnetic field, under certain conditions. For with the connections shown in Fig. 7 the currents in sections 2 and 4 will not be in phase with one another, nor in quadrature with the currents in sections 1 and 3. The E. M. F. triangle D, E, F constitutes an unbalanced 3-phase system such as indicated by Fig. 10 in which OA is the current in sections 1 and 3, OC the current in section 2 and OB the current in section 4. These currents are such that the vector sum of OB and OC is equal and opposite to OA (as in a balanced 3-phase system), and the vector difference OC—OB is equal to 2OA and in quadrature with OA.

Figure 11:
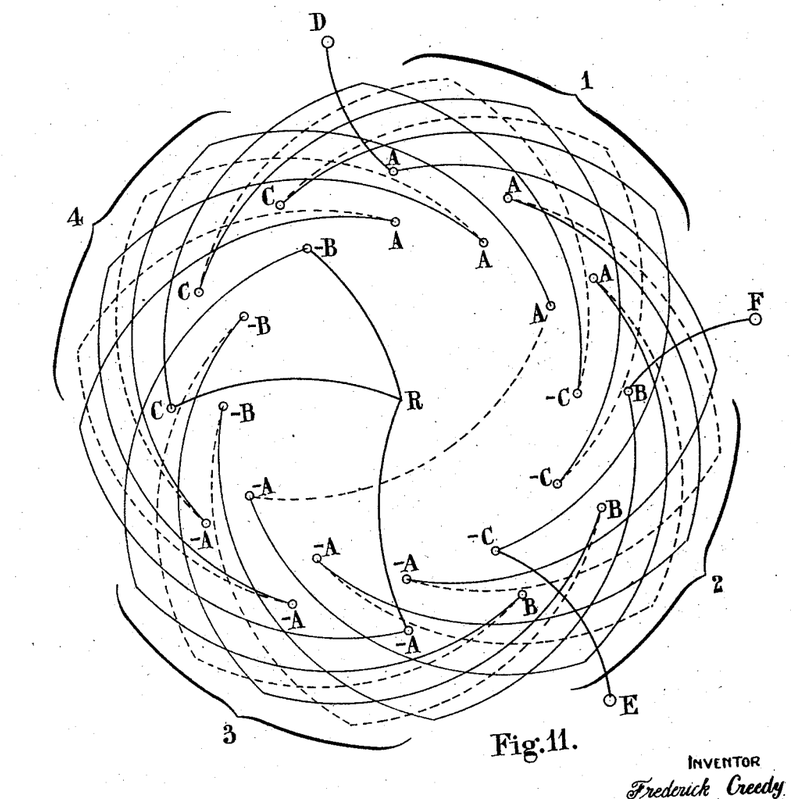

Now if the sections 1, 2, 3, and 4 of Fig. 7 form portions of a two-layer drum winding having, say, three slots per section, with the conductors connected as shown in Fig. 11, the three slots of section 1 have both their inner and outer conductors carrying a current A (of phase OA Fig. 10), so that the total current per slot is 2A and in the three slots of section 3 the total current is —2A; while in the slots of section 2 the outer conductors carry current B and the inner conductors carry current —C, making the current per slot B—C; and similarly the current per slot of section 4 is C—B.

It follows then that if such a winding be supplied from a triangle of E. M. F. such as indicated in Fig. 7, the total current in the slots of section 4 will be twice the total current of the slots of section 3, say, and in quadrature with it; and the current in the slots of section 2 will be equal and opposite to the current in the slots of section 4. Hence, although the sections of the winding do not carry 2-phase currents, the distribution of E. M. F. is identical with that in a 2-phase motor.

The satisfactory employment of the T-connection is not however limited to windings in which the phases B and C, i. e. the sections of the two "short" or horizontal arms of the T completely overlap; it is generally sufficient if there is some overlap. Whether in any particular case the magnetic field will be too much distorted can be ascertained by constructing a diagram according to Hellmund's method, (see the Transactions of the American Institute of Electrical Engineers 1908 with Graphical Treatment of the Rotating Field).

The practical application of these various methods of phase transformation in the production of a machine of variable pole number will be made clear by considering their employment upon a machine such as has been referred to having 36 sections and requiring a maximum of 36 phases.

Figure 2:
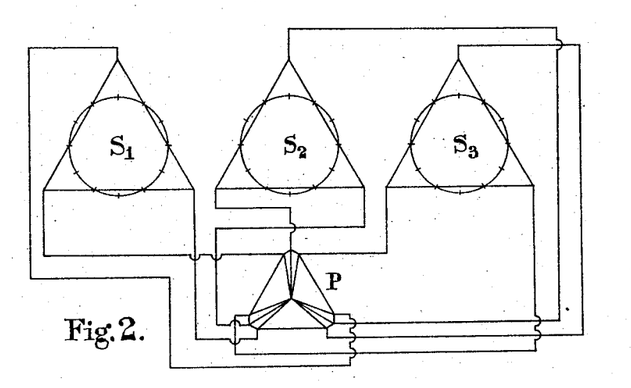
Fig. 2 illustrates a method of producing such a polyphase supply from a supply of small number of phases.

It has been shown for instance that 3-phase may be transformed to 12-phase by the motor winding, which for this purpose must have 12 or a multiple of 12 sections If this be made the final stage of transformation a phase transformer is required of the kind shown at P in Fig. 2, which converts the 3-phase supply into three 3-phase supplies displaced 10 degrees one from another. Phase transformers such as $S_1$ are not needed, but instead the sections of the motor winding to which the phase transformer P is joined are interconnected in the manner shown in Fig. 5, so that each of the 3-phase supplies from the transformer gives rise to 12-phase E. M. F.'s in the motor windings. To supply the 36 phases by this method then, necessitates only a transformer having 9 terminals arranged in 3 sets of 3.

Figure 6:
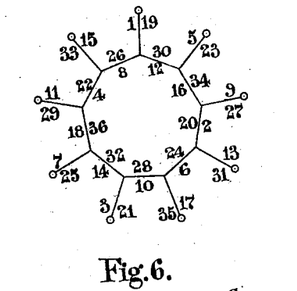

Another method of interconnection for producing 36 phases has been explained with reference to Fig. 6. If this be adopted the transformer again needs but 9 terminals, but in this case the phases to be supplied from the transformer are equally displaced at 40 degrees from each other; hence the shape of the E. M. F. polygon required by the motor is not so similar as in the case just described to the E. M. F. polygon of supply.

It has been shown above that if this motor with 36 sections in its winding is to work on all pole numbers from 2 to 20 it requires other numbers of phases besides 36, namely 4, 6, 9, 12 and 18. It has been shown how 6- and 12-phase can be obtained direct from the 3-phase supply by suitable interconnection of the sections of the winding. It has been shown also how 9-phase and 18-phase may be obtained by the use of a transformer which distorts the E. M. F. triangle of supply into a 9 sided polygon the radii to whose vertices are all equal and spaced apart by angles of 20°, 20°, 80°, 20°, 20°, 80°, 20° 20°, 80°, respectively. The 4-phase can be produced by either the T or L method.

Figures 12, 13, 14, 15:
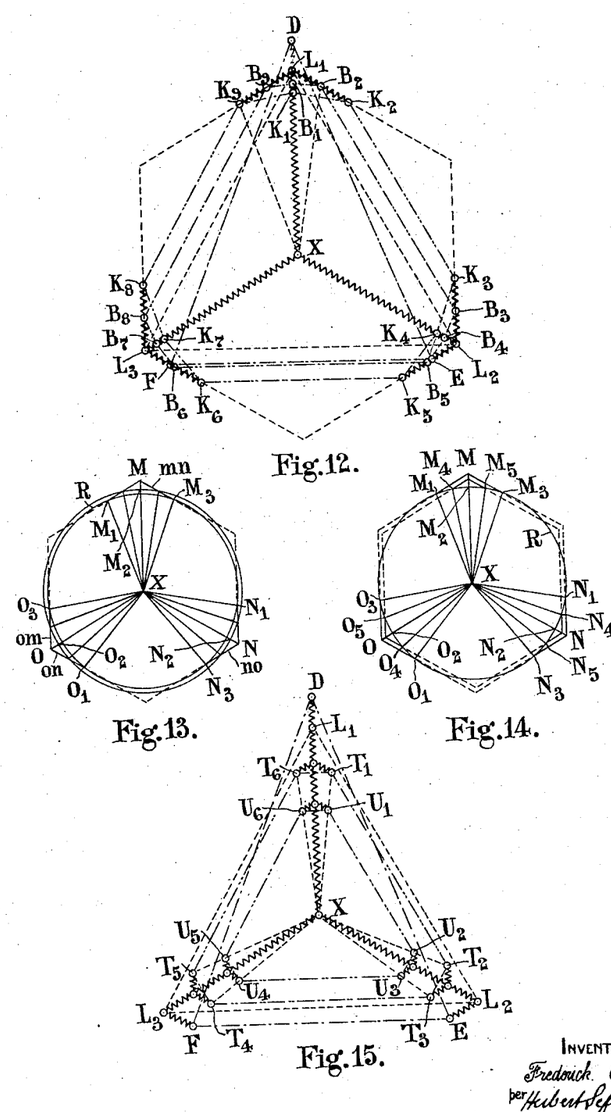
Fig. 12 is illustrative of the E. M. F. polygons produced by a phase transforming apparatus and of the construction of such apparatus.
Figs. 13 and 14 relate to the design of such phase transforming apparatus.
Fig. 15 is illustrative of the E. M. F. polygons produced by another phase transforming apparatus and of the construction of such apparatus.

Fig. 12 shows the diagram of a single transformer for giving all these necessary numbers of phases. The dotted triangle $L_1$, $L_2$, $L_3$, is the E. M. F. polygon of the 3-phase supply; the polygon $B_1$, $B_2$, ... $B_9$ is that for the three sets of 3-phase with 10° displacement between the sets for giving 36 phases in windings connected as in Fig. 5; the polygon DEF is that for 4-phase with T-connection; the polygon $K_1$, $K_2$, $K_3$, ... $K_9$ is that for 9 phases displaced 20°, 80°, 20°, successively as stated above. The secondary windings shown by wavy lines from the points $L_1$, $L_2$, $L_3$, are wound on that limb of the transformer which carries the primary winding ($XL_1$, etc.), to which they are parallel. Some phases can be obtained by tappings without secondary windings, viz. $B_1$, $K_1$, $B_4$, $K_4$, $B_7$ and $K_7$. Phase D is obtained by a short secondary on the same limb as the primary to which it is connected. Phases $B_2$, $K_2$, $K_3$, $B_3$, E, $B_5$, $K_5$, $K_6$, $B_6$, F, $B_8$, $K_8$, $K_9$, and $B_9$ are all obtained from six comparatively short secondary windings on the limbs of the primary phases to which they are parallel. Thus all the phases required are obtained with comparatively little transformation from the 3 primary phases.

In some cases, a reduction of the number of sections in the motor winding materially lessens the number of phases required to produce a particular number of poles. For instance, in a winding with 36 sections 12 phases are needed to produce 6 poles; whereas if the winding had but 18 sections 6 phases would produce 6 poles. In these circumstances it may be convenient to reduce the number of sections of the winding on particular pole numbers, which may be done either by joining pairs of sections in series and treating them as single sections, or by leaving certain sections idle. The particular method of connection where sections are joined together depends on the particular purpose in view, but in general there must always be the same total number of turns in each phase. The case just mentioned is met by joining adjacent pairs of sections in series. In another case, for instance, if 36 sections have to be reduced to 24 so that 8 poles may be produced by 6 instead of 9 phases, every third section may be left intact, and the pairs of sections between joined in series. To suit a 4-phase supply there may be two sections joined in series, followed by two more sections joined in series, followed by two single sections and so forth. And occasionally it may be found an advantage to use alternately two and three sections connected in series, of two and four, or three and four and so on. In general, the total number of resultant effective sections, whether single ones or composed of two or more adjacent sections in series, will be proportional to the pole number, more sections being combined in series as the pole number required is reduced. Such interconnecting of the sections may, of course, be done by the controller, and need not affect the motor itself.

If the sections are left idle they should be uniformly spaced around the periphery of the winding; this method is only possible when the number of sections left idle is equal to or a multiple of the number of poles. An example is the reduction of 24 sections to 18, in order that 6 instead of 8 phases may suffice to produce 6 poles, by leaving every fourth section idle.

The selection of the most suitable methods of interconnection from among those above described, for a particular machine required to operate on particular pole numbers is best made by studying the rotating field by Hellmund's method already referred to, the use of which in the design of machines of this class has been described in my former application.

To obtain the greatest possible output from a motor the speed of which is varied by changing its pole number, the flux density in the air gap must be kept approximately constant for all pole numbers. This involves each section of the motor winding having applied to it a voltage approximately proportional to the speed of the machine; or, to be more exact, taking account of the variation of pitch, approximately proportional to the speed of the motor multiplied by the chord factor, which is the sine of half the angular pitch. This decrease in the secondary voltage applied to the motor may be obtained by increasing the primary turns in the phase converter by the use of tappings, or by other methods already referred to. Variation of the primary turns changes the magnitude of all the secondary voltages without changing their phase relation. By means of the various methods described it is possible to get almost any voltage desired across any section of the winding at any speed. Usually one of the possible connections described will be found to give approximately the required voltage. But if resort is had to variation of the primary turns of the phase converter, such variation should be kept as small as possible in order that the converter itself may be kept small. Consequently it is a consideration to be borne in mind in design to so select the methods of connection that the lower the speed the more sections there are in series; and similarly mesh connections are rather to be preferred for the high speeds and star connections for the low speeds. An instance of such selection is to be seen in the 8-pole connection of Fig. 16 hereinafter described. And another may be found in the motor with 36 sections already considered. That motor for either 8 poles or 16 poles required 9-phase E. M. F.'s, consisting of three 3-phase sets displaced 20 degrees from each other. It is then convenient to have two sections in series for each phase for the 8 pole connection, and 4 sections in series for the 16 pole connection. Or a rather less exact approximation to the desired conditions may be got by using the 4 sections in series mesh-connected for the 8 pole connection, and 4 sections in series star-connected for the 16 pole connection.

The design of a phase transformer of the type described with reference to Fig. 2 or Fig. 12 is facilitated by the construction of a vector diagram for it in the manner shown in Fig. 13. Vectors M, N, O, at 120 degrees with each other represent the primary E. M. F.'s. Circumscribe a hexagon about these vectors, so that from the end of each vector extend two sides of the hexagon parallel to the remaining vectors. Intercepts on these sides will then represent E. M. F.'s which can be obtained by secondary windings on the limbs of the transformer to which the sides are parallel. Any circle R intermediate in size between the inscribed and circumscribed circles will cut the sides of the hexagon symmetrically on either side of each vector, as at $M_1$, $M_2$, $N_1$, $N_2$, $O_1$, $O_2$, and will also cut the vectors themselves as at $M_2$, $N_2$, $O_2$. If radii be drawn to the points $M_1$, $M_3$, etc., those radii represent E. M. F.'s which can be got by joining in series with the primary winding represented by vector M, for instance, a secondary winding represented by mn, which is on the limb carrying the primary winding represented by N and has a number of turns represented by the length $MM_3$. Similarly the intercepts nm, no, on, om, mo represent secondary windings intended to be joined to the primary winding indicated by their first letter and actually wound on the limb indicated by their second letter. Further the intersections $M_2$, $N_2$, $O_2$ represent tappings on the respective primary windings. By suitable choice of the size of the circle the angle $MXM_3$ can be made to have any value desired, for instance, 10 degrees or 20 degrees, to produce the transformer for supplying 9 phases for conversion into 36-phase, or one supplying 9 phases for conversion into 18 or into a regular 9-phase system as above described.

The method is of general application. If five or more sets of 3-phase vectors are required they can be got by drawing a second, and if necessary a third and fourth hexagon from tapping points in the primary vectors so placed that the intercepts cut off by the circle R give the desired values for the angles $M_4XM$, $MXM_5$, etc. If an even number of sets of phases is needed the intersection of the circle with the vector itself is disregarded.

In an alternative method of drawing these vector diagrams, the first hexagon may be drawn with three of its sides at right angles to the three vectors of primary E. M. F. In this case the outer end of each of these vectors lies at the mid-point of one side of the hexagon instead of at one of its vertices.

A similar method of design applies if the supply is other than 3-phase. For a 2-phase 4-wire supply one or more squares will replace the hexagon or hexagons, and in this case also the ends of the star-connected winding may preferably lie at the mid-point of the sides of the square.

A transformer of similar type can be used to supply motor sections which are T-connected or L-connected for the production of 2- or 4-phase. Its design by the aid of the vector diagram will be understood from Fig. 12. An isosceles triangle such as DEF, the height of which is equal to its base, is first drawn. A regular hexagon is then superposed on this so that the vertex of the triangle lies upon a radius of the hexagon or upon its prolongations, while the ends of the base lie on the opposite adjacent sides of the hexagon or on their prolongations. Three radii $XL_1$, $XL_2$, $XL_3$ of this hexagon represent the star-connected 3-phase primary winding. The intercepts on the sides of the hexagon or on their prolongations between the ends of the base of the triangle and the angles of the hexagon indicate the secondary windings required. The best design is arrived at by slightly varying the size of the triangle, its vertex being always on the radius of the hexagon and its base angles on the sides of the hexagon, so as to discover the position of the tapping points which will necessitate the least amount of secondary windings.

In the case of a 2-phase 3-wire system the transformer previously described for distorting the equilateral triangle of E. M. F. to an isosceles triangle whose height is half its base may conversely be employed to produce an equilateral triangle of E. M. F. from the 2-phase supply; by which means all the connections of motor windings and phase transformers already described are made available with 2-phase 3-wire system.

Fig. 15 shows the E. M. F. polygon of a phase converter receiving 3-phase current and supplying phases up to 24. The triangle $L_1$, $L_2$, $L_3$, represents the E. M. F. polygon of the 3-phase supply. The triangle DEF is the polygon for 4-phase with T-connected windings. The polygon $T_1$, $T_2$, ... $T_6$, is that for producing 24 phases by the aid of two sets of motor windings connected to transform 3-phase to 12-phase; the angle between the radii through $T_6$ and $T_1$ is 15°, that between $T_1$ and $T_2$ is 105° and so on. The polygon $U_1$, $U_2$ ... $U_6$ is similar to $T_1$, $T_2$, ... $T_6$ but gives reduced voltages for use on lower speeds. It is to be noted that the horse power output of the motor is reduced as the speed decreases; hence for low speeds the transformer is more lightly loaded and therefore it is permissible for the E. M. F. polygon for low speeds to depart further from the polygon of supply E. M. F.

Fig. 17 shows by way of example a complete variable pole dynamo electric system according to this invention comprising a phase transformer supplied from mains Z, a winding V divided into sections, say the primary winding of a motor, and a controller W for interconnecting said sections among themselves and to the terminals of the phase transformer. For the sake of clearness the transformer is shown as having a separate primary winding Y provided with tappings by which the number of turns in the winding can be varied; but naturally the supply may be joined to the same winding as is connected to the motor, and the only secondary windings necessarily required are the small sections such as $L_0F$ the construction and function of which has been already explained.

It is immaterial to the present invention what type of controller W is employed. Suitable construction of controller have been indicated in my former specification, particularly with reference to Fig. 3 and Fig. 15 thereof.

In applying such controllers to the motors of the present application, the sections of the motor winding need to be joined both to bus-bars and to brushes, and it is of advantage to join the phases of supply to bus-bars. It is not always necessary to bring out the ends of every section to terminals. If the total number of sections is even, the opposite sections will be in opposite phases on odd numbers of pole pairs, and in the same phase on even pole pair numbers. It may therefore be possible to join two ends of such sections together and bring out the junction to a single terminal; supplying the sections in parallel through this terminal on odd numbers of pairs of poles, and supplying them in series without using the junction terminal on even numbers of pole pairs; or vice versa if the sections are so joined as to be mutually reversed.

Figure 16:
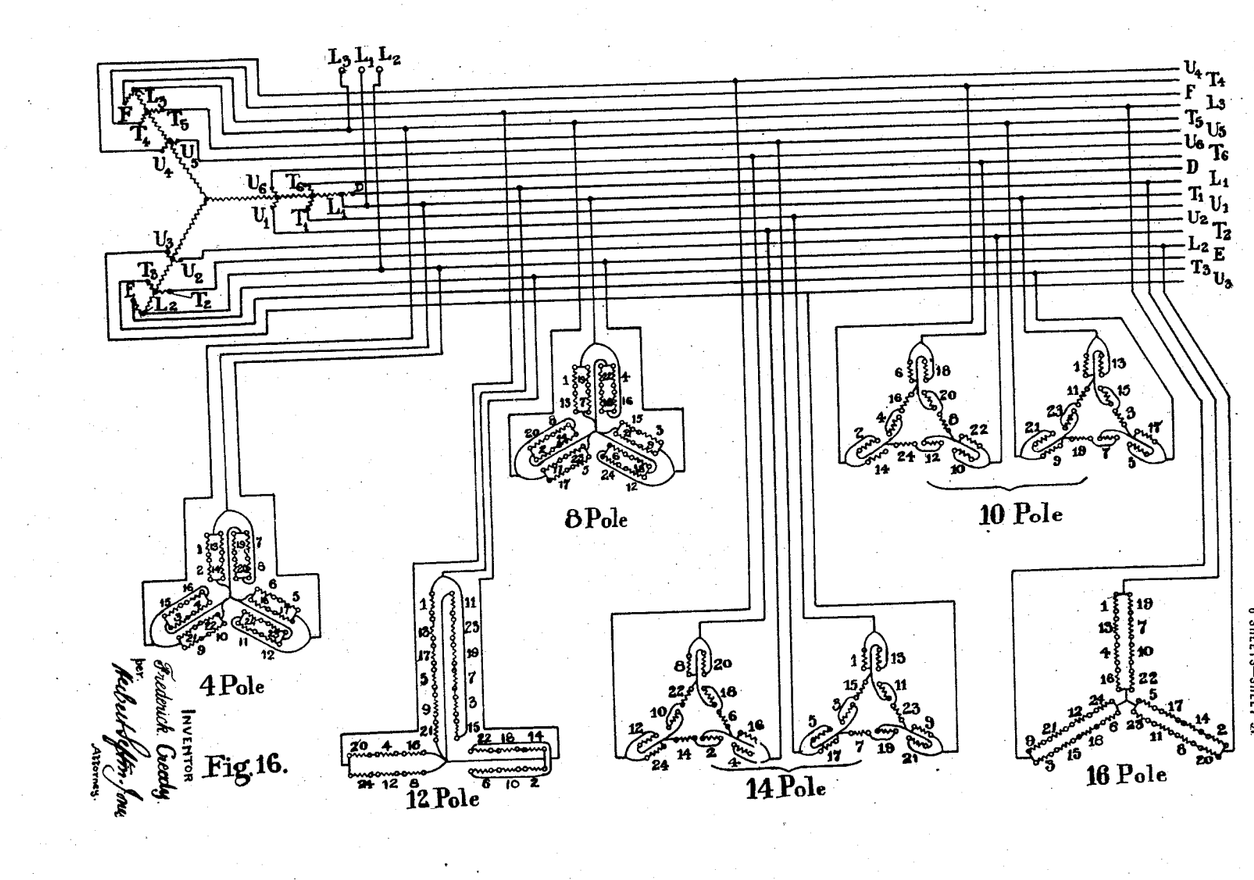
Fig. 16 is a diagram of a phase transforming apparatus and motor winding explaining the various interconnections of the sections of the motor winding with each other and the phase transforming apparatus produced in the operation of the motor, control apparatus, and generating apparatus shown in Fig. 17.

The motor chosen for illustration in Figs. 16 and 17 has 24 sections which are numbered consecutively and occupy on the motor the position indicated in Fig. 17; it is operated from the 3-phase prime source Z; and the phase converter is designed to supply all the phases necessary for the operation of the motor on 4, 8, 10, 12, 14 and 16 poles; the phases not supplied by the converter being produced in the motor winding by interconnection of its sections in the manner already described and shown in detail for each case in Fig. 16.

For 4-pole working the current is taken direct from the 3-phase supply. The sections are joined as a star of which each ray is made up of four parallel sets of two sections each, half the sections being reversed.

The 8-pole connection is the same in form as that for 4-poles, but the sections are joined in a different order.

For 10-pole working use is made of the combined star-mesh connection. The sections of the winding are divided into two sets, each of which forms a 3-limb mesh in the centre of the 3-ray star, each limb consisting of two mutually reversed sections in series, and each ray of two mutually reversed sections in parallel. Each of these sets converts 3-phase to 12-phase, and as the one set is supplied from terminals $T_1$, $T_3$, $T_5$ and the other from terminals $T_4$, $T_2$, $T_6$, i. e. from two 3-phase supplies differing in phase from each other by 15 degrees, the whole effect is to produce 24 phases in the winding.

The 12-pole connection is an example of the application of the T-connection. DEF are converter terminals which give a 4-phase supply suitable for T-connected windings. The odd numbered sections in two mutually reversed parallel groups of 6 sections in series form the vertical limb of the T, each of the horizontal limbs consisting of two parallel groups of 3 sections in series.

The 14-pole connection is again the same in form as the 10-pole connection, but with a different order of connection of the sections, and as the speed with this connection will be lower the terminals are joined to terminals $U_1$, $U_2$, . . . $U_6$ instead of to the terminals $T_1$, $T_2$ . . . $T_6$ of the phase converter so reducing the voltage per section.

For 16-pole working the supply is again taken direct from the 3-phase terminals $L_1$, $L_2$, $L_3$; the sections forming a 3-row star, each row of which consists of 2 parallel groups of 4 sections in series.

Consideration of these examples of connection reveals various simple rules governing the phase relation of the sections for different pole numbers, a knowledge of which helps in the design of the connections. For example if the total number of sections is even, so that each has another diametrically opposite to it, any two opposite sections will be in phase on even numbers of pole pairs, and in opposite phases on odd numbers. Also any 3 sections differing in position by one third of the circumference will be in phase if the number of pole pairs is 3 or a multiple of 3, and otherwise will form a regular 3-phase system. Similarly 4 sections uniformly spaced around the circumference will form a regular 4-phase system unless the number of pole pairs is divisible by 4 in which case the sections are in phase, or is divisible by 2 and not by 4 when opposite sections are in phase and intermediate ones are in opposition of phase.

Stated generally the rule is this, that $p$ coils uniformly distributed around the circumference of the winding form a regular system of $p$-phases except when the number of pairs of poles on which the machine is running is a multiple of $p$ when the coils are all in phase, or a submultiple $\frac{p}{x}$ of $p$, in which case the coils form a system or systems of $x$ phases.

In large machines the change from one speed to another may cause considerable momentary rushes of current, which it is desirable to avoid or limit as far as possible. For this purpose it is preferable to effect a change of speed in two steps. First the pole number is changed say from $p$ to $p-2$, and simultaneously the machine is switched on to a voltage less than the normal by means of resistances or by the use of tappings such as are shown on the winding Y in Fig. 17.

or such as $U_1, U_2 \ldots U_6$; then by a second movement of the controller the voltage is restored to normal value. The reduction of voltage is required both in increasing and in decreasing speed.

It will be understood that the particular windings described are examples only, and should not suggest that there is any restriction whatever upon the number of sections a winding can have. And the windings described, though chiefly considered as windings of a motor, may be the windings of any machine requiring various pole numbers to be induced in it.

What I claim is:—

1. In combination, a source of a system of balanced polyphase E. M. F.'s of small phase number, means for deriving therefrom a plurality of systems of balanced polyphase E. M. F.'s of the same phase number constituting together a system of larger phase number with unequally spaced phases, a dynamo electric machine, a primary winding on said machine divided into sections, means for interconnecting those sections and connecting them to the said system of unequally spaced phases so as to produce in said sections a polyphase system of currents with a constant phase difference between neighbouring sections of yet larger phase number forming a given number of poles, and means for connecting said sections together and to the supply so as to form a different number of poles.

2. In combination, a source of a system of balanced polyphase E. M. F.'s, means for producing therefrom a number of systems of balanced polyphase E. M. F.'s differing from each other by a phase angle less than the angle between the phases of one system divided by the number of systems, a dynamo electric machine, a primary winding on said machine divided into sections, means for interconnecting those sections and connecting them to the said systems of polyphase E. M. F.'s so as to produce in said sections a polyphase system of currents with a constant phase difference between neighbouring sections forming a given number of poles, and means for connecting said sections together and to the supply so as to form a different number of poles.

3. In combination, a source of a system of balanced polyphase E. M. F.'s, a dynamo electric machine, a primary winding on said machine divided into sections, means for deriving from said source a number of systems of balanced polyphase E. M. F.'s differing from each other by the phase difference required betwen adjacent sections of said winding for a particular pole number, means for joining said sections in mutually reversed pairs, means for interconnecting said reversed pairs with each other and with said systems to produce said pole number so that the same number of sections is supplied from each of said systems and of the sections supplied from any one system half are in star and half in mesh, and means for differently connecting said sections to each other and the supply so as to produce a different pole number.

4. In combination, a source of a system of balanced polyphase E. M. F.'s, means for deriving therefrom a system of polyphase E. M. F.'s of higher phase number with unequally spaced phases but having an E. M. F. polygon approximating to that of the original system, a dynamo electric machine, a primary winding on said machine divided into sections, means for connecting said sections to each other and the system with unequally spaced phases so as to produce in said winding a system of polyphase currents with a constant phase difference between neighbouring sections and a particular pole number, and means for connecting said sections together and to the supply so as to produce a different pole number.

5. In combination, a source of polyphase supply, a dynamo electric machine, a primary winding on said machine divided into sections, means for joining neighbouring sections in series in sets symmetrically spaced around the circumference so as to form composite sections and for joining the sections together and to the supply phases to produce a particular pole number, and means for disconnecting the sections of a set from each other and joining them to different phases of supply to produce another pole number.

6. In combination, a polyphase supply, a dynamo electric machine, a primary winding on said machine divided into sections, means for joining said sections in order to the phases of supply to produce a particular pole number, means for joining some of said sections in sets in series to form composite sections evenly spaced around the circumference, and means for joining the remaining sections and said composite sections to each other and the supply phases to produce another pole number.

7. In combination, a source of polyphase supply of phase and voltage suitable for T and L connected windings, a dynamo electric machine, a primary winding on said machine divided into sections, means for joining some of said sections in T and others in L, and means for connecting said groups of sections and joining them to appropriate phases and voltages of supply.

8. In combination, a source of polyphase supply, a dynamo electric machine, a primary winding on said machine divided into sections, means for joining said sections to the phases of supply in different orders to produce different pole numbers, and means for joining sets of neighbouring sections in series symmetrically throughout the winding, and for connecting the sections thus compounded to the phases of supply so as to produce another pole number.

9. In combination, a polyphase source of electric supply, a dynamo electric machine, a primary winding on said machine divided into a number of sections, means for connecting said sections in a plurality of different relative arrangements to the source of supply so that E. M. F. polygons having a number of sides greater than that of supply but less than the number of distinct phases of current in all the sections applied across said interconnected sections produce for all connections the same number of bands of current equally spaced in phase relation, but for each connection a different phase displacement between neighbouring sections, and means for distorting the E. M. F. polygon of supply to the forms required for said different connections.

10. In combination, a polyphase source of electric supply, a dynamo electric machine, a primary winding on said machine divided into a number of sections, means for interconnecting said sections in mutually reversed pairs in a plurality of different ways so that E. M. F. polygons having a number of sides greater than that of supply but less than the number of distinct phases of current in all sections applied across said interconnected sections produce for all connections the same number of bands of current equally spaced in phase relation, but for each connection a different phase displacement between neighbouring sections, and means for distorting the E. M. F. polygon of supply to the forms required for said different connections.

11. In combination, a polyphase source of electric supply, a dynamo electric machine, a primary winding on said machine divided into a number of sections, means for interconnecting said sections half in mesh and half in star relation in a plurality of different ways so that E. M. F. polygons having a number of sides greater than that of supply but less than the number of sections applied across said interconnected sections produce for all connections the same number of bands of current equally spaced in phase relation, but for each connection a different phase displacement between neighbouring sections, and means for distorting the E. M. F. polygon of supply to the forms required for said different connections.

12. In combination, a polyphase supply, an electric motor, a primary winding on said motor divided into sections, means for joining said sections in T to each other and the supply to produce a given pole number, and means for joining said sections into a mesh in the centre of a star and for joining the terminals of the star to the supply to produce a different pole number.

13. In combination, a polyphase supply, an electric motor, a primary winding on said motor divided into sections, means for joining said sections in groups in series to each other and said supply so as to produce a particular pole number and a particular number of zones of current around the motor circumference and means for joining said sections in groups in parallel to each other and said supply so as to produce the same number of zones of current to a smaller number of pole pairs.

14. In combination, a polyphase source of electric supply, a dynamo electric machine, a primary winding on said machine divided into a number of sections, means for interconnecting said sections in mutually reversed pairs to form a mesh in the centre of a star in a plurality of different ways so that E. M. F. polygons having a number of sides greater than that of supply but less than the number of sections applied across said interconnected sections produce for all connections the same number of bands of current equally spaced in phase relation, but for each connection a different phase displacement between neighbouring sections, and means for distorting the E. M. F. polygon of supply to the forms required for said different connections.

15. In combination, a polyphase source of electric supply, a dynamo electric machine, a primary winding on said machine divided into a number of sections, means for interconnecting said sections in at least three different ways, so that E. M. F. polygons approximating to that of supply applied across said interconnected sections produce at least three different numbers of poles but substantially the same flux density in the air gap, and means for distorting the E. M. F. polygon of supply to the forms required for said different interconnections.

16. In combination, a polyphase source of electric supply, a dynamo electric machine, a primary winding on said machine divided into a number of sections, means for interconnecting said sections in at least three different ways so that E. M. F. polygons approximating to that of supply applied across said interconnected sections produce for all connections the same number of bands of current equally spaced in phase relation, but for each connection a different phase displacement between neighbouring sections, and means for distorting the E. M. F. polygon of supply to the forms required for said different connections.

17. In combination, a polyphase supply, an electric motor, a primary winding on said motor of the two-layer drum type divided into sections, and connections between said sections and the supply joining them in. T, the sections belonging to the two parts of the bisected phase overlapping upon the periphery of the motor.

18. In combination, a dynamo electric machine, a primary winding on said machine divided into sections, a source of polyphase supply, and means for interconnecting said sections with each other and the supply so as to form parallel groups and mesh connections producing low pole numbers, and so as to form series groups and star connections producing high pole numbers.

19. In combination, a polyphase supply, an electric motor, a primary winding on said motor divided into sections, means for connecting said sections in star to each other and the supply so as to produce a particular pole number with a particular number of sections in series across each phase of the supply, and means for connecting said sections together and to the supply in a different star, having more sections in series across each phase and producing a larger pole number.

20. In combination, a polyphase source of supply, an electric motor, a primary winding on said motor divided into sections, means for joining said sections to each other and the supply in star, so as to produce a particular pole number with a particular number of sections between two terminals of the supply, and means for joining said sections to each other and the supply, so as to form a mesh in the centre of a star and to produce a larger pole number with a larger number of sections between any two terminals of the supply.

21. A method of producing a given pole number in dynamo electric machines which consists in selecting symmetrical groups of sections which require the least phase difference between them for that pole number for connection to supply phases, and joining to each section of a group all other sections which require the same phase as or the opposite phase to that section, and finally completing a connection between a section of one group and the corresponding section of another group through sections which require a phase mid-way between the phases of said sections, or a phase in opposition to such mid-way phase.

22. In combination, a dynamo electric machine, a primary winding on said machine divided into sections, permanent connections between opposite sections, and a controller joined to said permanent connections and to the remaining ends of said sections for connecting said sections together and to the supply to produce different pole numbers but always the same number of zones of current.

23. In combination, a source of a system of balanced polyphase E. M. F.'s, a dynamo electric machine, a primary winding on said machine divided into sections, means for deriving from said source a number of systems of balanced polyphase E. M. F.'s differing from each other by the phase difference required between adjacent sections of said winding for a particular pole number, means for interconnecting said sections with each other and with said systems to produce said pole number so that the same number of sections is supplied from each of said systems, and of the sections supplied from any one system half are in star and half in mesh, and means for differently connecting said sections to each other and the supply so as to produce a different pole number.

24. In combination a source of a system of balanced polyphase E. M. F.'s, means for deriving therefrom a number of systems of balanced polyphase E. M. F.'s constituting together a system of larger phase number with unequally spaced phases, a dynamo electric machine, a primary winding on said machine divided into sections, means for joining one half of said sections in mesh relation and the remainder in star connection each star ray being joined on the one hand to the angle of a mesh and on the other hand to a phase of said system of larger phase number so as to produce a particular pole number, and means for joining said sections to each other and the supply in a different relation to produce another pole number.

25. In combination, a polyphase source of electric supply, a dynamo electric machine, a primary winding on said machine divided into a number of sections, means for interconnecting said sections half in mesh relation and the remainder in star arms each radiating from a mesh angle in a plurality of different ways so that E. M. F. polygons having a number of sides greater than that of supply but less than the number of sections applied to the ends of said star arms produce for all connections the same number of bands of current equally spaced in phase relation, but for each connection a different phase displacement between neighbouring sections, and means for distorting the E. M. F. polygon of supply to the forms required for said different connections.

26. In combination, a polyphase source of electric supply, a dynamo electric machine, a primary winding on said machine divided into a number of sections, means for interconnecting said sections in mutually reversed pairs half in mesh relation and the remainder in star arms each radiating from a mesh angle in a plurality of different ways so that E. M. F. polygons having a number of sides greater than that of supply but less than the number of sections applied to the ends of said star arms produce for all connections the same number of bands of current equally spaced in phase relation, but for each connection a different phase displacement between neighbouring sections, and means for distorting the E. M. F. polygon of supply to the forms required for said different connections.

27. In combination a polyphase source of supply, a dynamo electric machine, a primary winding on said machine divided into sections, means for connecting said sections in a plurality of groups such that a polyphase supply applied to a group produces currents of larger phase number in the sections of the group, means for connecting said groups to the supply so as to produce a given number of poles, and means for reversing the order of the phases applied to one group and for shifting the phase of the currents in all the sections of each other group through a given angle the same for all the sections of a group and reversing the order of the phases to produce another pole number.

28. In combination a polyphase source of supply, a dynamo electric machine, a primary winding on said machine divided into sections, means connecting a sub-multiple of the whole number of sections into a group, means for connecting said group and the remaining sections to the source of supply to produce a given pole number, and means for varying the connections of said group as a whole and of the remaining sections with the supply to produce another pole number.

29. A method of connecting a winding divided into sections which is required to produce two pole numbers such that the phase difference between neighbouring sections on one pole number is the supplement of the phase difference between neighbouring sections on the other pole number, which consists in joining alternate sections of the winding for both pole numbers into a symmetrical network and joining the remaining sections into one network for the one pole number and into a different network for the other pole number.

30. A method of connecting a winding divided into sections which is required to produce two pole numbers such that the sum of the two numbers of pole pairs is equal to a sub-multiple of the number of sections, which consists in joining for both pole numbers a group of equally spaced sections forming such sub-multiple into a symmetrical network, alternate sections of a group being joined into a mesh and the remaining sections of a group into star arms radiating from the junctions of said mesh, and joining the remaining sections into other networks.

In testimony whereof I sign my name to this specification.

FREDERICK CREEDY.